United States Patent Office 3,040,992
Patented June 26, 1962

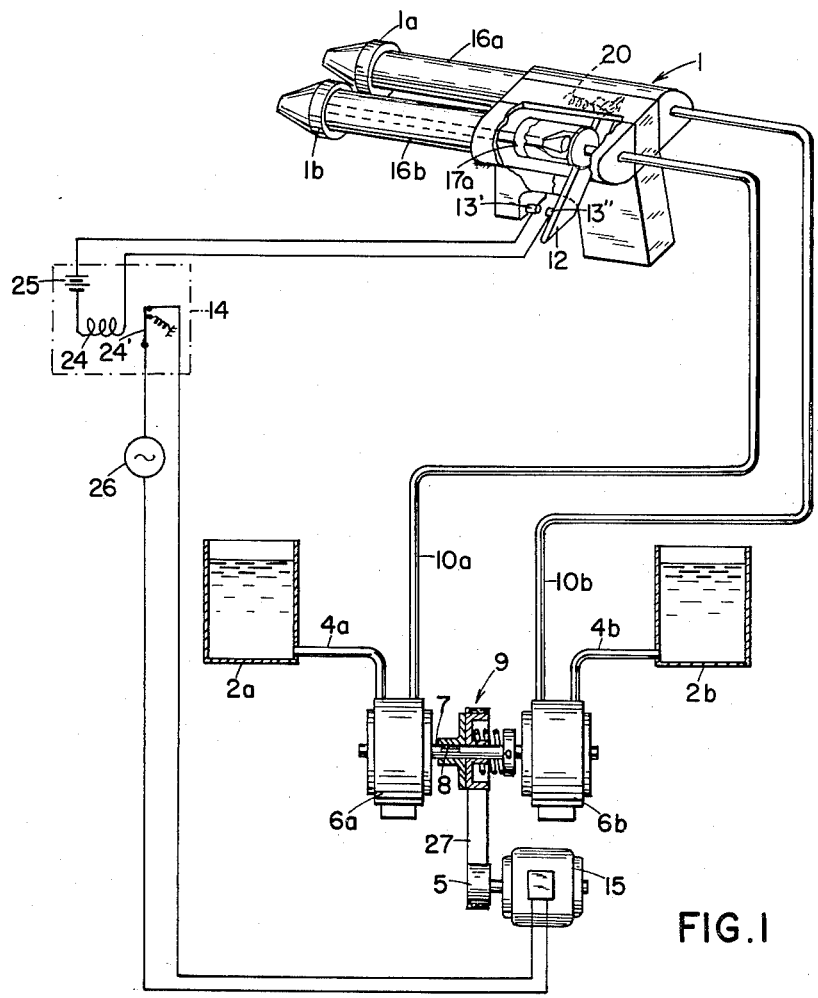
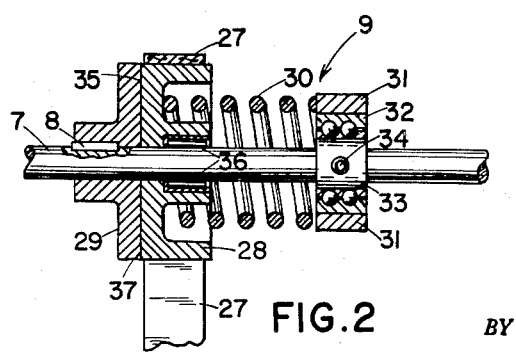
Willy Wiegand
INVENTOR.

3,040,992
FLUID-DISPENSING CONTROL
Willy Wiegand, Grenzstr. 97, Oberhausen,
Rhineland, Germany
Filed Oct. 17, 1960, Ser. No. 63,136
5 Claims. (Cl. 239—414)

My present invention relates to a control arrangement for fluid-dispensing apparatus, particularly for apparatus adapted for the simultaneous dispensation of a plurality of fluids under pressure and in a predetermined ratio.

Heretofore, devices of this type have generally made use of a plurality of proportioning pumps each connected to the supply reservoir for a respective component. The proportioning pumps were provided with common drive means whose speed was varied to effect a control of the efflux from the device. The combined output could not, however, be switched suddenly from its maximum value to zero as required in, for example, the spray distribution of coating materials (e.g. lacquers, paints, enamels and the like) containing highly volatile solvents.

Other control arrangements, employing pressure pumps, by-pass tubes and relief valves between the spraying or mixing chamber and the reservoir of each component to afford a regulated output, were found to be ineffective at low dispensing rates and to be unreliable.

It is an object of the present invention to provide a relatively simple and inexpensive dispensing-control arrangement adapted to obviate the above-mentioned disadvantages and to effect a positive regulation of the components between a maximum value and zero.

Another object of the invention is to provide means, in a control arrangement of this character, for suddenly cutting off the output flow of fluid.

According to a feature of my invention, I provide a joint throttle means for the outflow of the proportioning or metering force pumps whose common input shaft is operated from a constant-rate drive by a slipping clutch adapted to permit relative motion between the driven shaft and the drive. The clutch may have a first member rigidly connected to the driven shaft and a second member, rotatable relative thereto, coupled with the drive and adapted frictionally to engage the first member with varying degrees of slippage therebetween, the extent of slippage being determined by the resistance to the rotation of the shaft. Thus, when the full outflow from the force pumps is required, the output conduits connected thereto are unblocked so that the pumps are driven at their maximum rates and the driven shaft encounters only a minimum of resistance. When the outflow is throttled, however, the displacement members of the pumps encounter resistance and transmit this resistance to the driven shaft to slow the latter and to increase the slippage in the friction clutch. Since the constant-rate drive tends to apply a relatively constant torque to the driven shaft via the friction clutch, the outflow pressure is maintained substantially constant while the flow rate may be varied from the aforementioned maximum value to zero. At the latter value, the driven shaft will remain approximately stationary while the slippage in the clutch is at a maximum.

In accordance with another feature of the present invention, I provide means for cutting off the drive when the outflow reaches the zero value. When the proportioning pumps are used to feed a spray-gun, for example, the trigger thereof may be provided with a switch adapted to de-energize an electric-motor drive. In other applications of the dispensing control system, however, mechanically actuated switch means coupled to elements of the system other than the outflow control valve and manually operable cut-off devices, which act upon the drive, may be used.

The above and other objects, features and advantages of the invention will become more readily apparent from the following description, reference being made to the accompanying drawing in which:

FIG. 1 is a somewhat schematic plan view, with parts broken away, of a two-component spray system according to the invention; and FIG. 2 is an axial cross-sectional view of a detail of FIG. 1.

In the drawing I show a spray gun 1, whose barrels 16a and 16b terminate in the atomizing nozzles 1a and 1b, respectively, which is provided with a trigger 12. Two transmission tubes 10a and 10b are connected, respectively, to the proportioning force pumps 6a and 6b whence they extend to the spray gun. The tubs 10a and 10b feed the nozzles 1a and 1b through respective valves, operated by the trigger 12, only one of which is shown at 17a. The valve 17a, fed by tube 10a, is provided with a conical bore 18a adapted to be closed tightly by a conical plug 19a which may be displaced axially by means of the trigger 12. The latter is pivoted at its uppermost extremity to the top wall of the gun 1 and is provided with a restoring spring 20, also anchored to the top wall, when tends to maintain the plug 19a in its closed position by urging it against its seat 18a.

The proportioning pumps 6a, 6b are connected to their respective supply reservoirs 2a, 2b by means of the conduits 4a, 4b and are provided with a common shaft 7 which is driven by an electric motor 15 via a friction clutch 9, best seen in FIG. 2. The clutch 9 comprises a first disc 29 which is positively connected with the shaft 7 by a key 8 and has a clutch face 35. A second disc 28, which is journaled on the shaft 7 via a roller bearing 36, has a clutch face 37. The latter is urged against the clutch face 35 by means of a spring 30 which bears upon a sleeve 31. Sleeve 31 is journaled upon a ball-bearing collar 32 which rotates freely around a bushing 33. This bushing may be shifted axially along the shaft 7 merely by loosening its locking setscrew 34 and resetting the bushing 33 closer to or farther away from disc 28 to increase or to decrease the compression of spring 30, respectively. This disc 28 is positively driven from the pulley 5 of motor 15 by a transmission shown schematically as a belt 27.

The gun body and the trigger 12 are provided with electrical contacts 13', 13" which constitute a switch connected in series with a battery 25 and the coil 24 of a relay system generally designated 14 and shown in dot-dash lines. Contacts 13', 13" are closed when the valve member 19a is in contact with its seat 18a. The normally closed switch 24' of relay 14 is connected in series with the motor 15 and a source 26 of current therefor.

In operation, trigger 12 is depressed toward the handle of the gun 1, thereby open-circuiting the coil 24 and opening the gun valves such as valve 17a. Switch 24' concurrently closes a circuit for the motor 15 to energize the latter and to drive the pumps 6a and 6b via the clutch 9. Since the gun valves are open, only a small amount of resistance is encountered by the shaft 7 and, consequently, quantities of the two spray components contained in the reservoirs 2a and 2b are distributed with a minimum of slippage between the discs 28 and 29 of the clutch. When it is desired to reduce the quantity of fluid sprayed, the trigger 12 is released somewhat to throttle the fluid flow through the gun valves. The resistance to the rotation of shaft 7 immediately increases and the speed of the latter diminishes to compensate for the reduced flow sprayed from the gun. Since the disc 28 continues to rotate at its substantially constant rate, the slippage between the disc faces 35 and 37 increases at a rate corresponding to the throttling of fluid flow. The outflow of the nozzles 1a and 1b may be cut off completely and suddenly by restoring the trigger 12 to its forward position, thereby shutting the gun valves and, concurrently, closing the contacts 13', 13" to energize the coil 24 and to open the motor circuit.

The invention as described and illustrated may be modified and varied in many ways deemed to be within the ability of persons skilled in the art and intended to be included within the spirit and scope of the invention as defined by the appended claims.

I claim:

1. In a system for dispensing fluid, in combination, a force pump having discharge means for said fluid, drive means for said pump, said pump being provided with an input shaft, slipping-clutch coupling means operatively connecting said drive means to said pump with a slippage varying with the resistance encountered by said pump, said coupling means comprising a first member rigidly secured to said shaft and a second member positively connected with said drive means, said first member having a first clutch face and said second member having a second clutch face, compression means urging said second clutching face against said first clutching face for slippable frictional entrainment of said first member by said second member, variable throttle means operatively connected to said discharge means for regulating the outflow of said fluid from the latter, and cut-off means for halting said drive means concurrently with a reduction of the outflow from said discharge means to a predetermined minimum value.

2. The combination according to claim 1 wherein said drive means comprises an electric motor and said cut-off means comprises switch means for de-energizing said electric motor, said throttle means including a manually actuable trigger, said switch means being engageable by said trigger upon the release thereof to de-energize said electric motor.

3. In a system for dispensing simultaneously a plurality of fluids, in combination, a proportioning force pump for each of said fluids, said pumps being rigidly interconnected for operation in unison, each of said pumps being provided with an outlet conduit, variable throttle means connected to said conduits for regulating the flow of said fluids from said pumps, nozzle means ahead of said throttle means for dispensing fluids passed by said conduits, common drive means for said pumps, slipping-clutch coupling means operatively connecting said drive means to said pumps, the slippage of said coupling means varying with the resistance to the operation of said pump, and trigger means for operating said throttle means.

4. The combination according to claim 3 wherein said drive means is an electric motor, further comprising switch means connected to said trigger means for de-energizing said motor concurrently with the throttling of the outflow from said nozzle means to a predetermined minimum value.

5. The combination according to claim 3 wherein said pumps are provided with a common driven shaft, said coupling means comprising a first clutch member secured to said shaft, a second clutch member adapted frictionally to engage said first clutch member and journaled upon said shaft, transmission means positively connecting said motor with said second clutch member for rotating the latter at a substantially constant speed, and resilient means urging said second clutch member frictionally against said first clutch member.

References Cited in the file of this patent
UNITED STATES PATENTS

| | | |
|---|---|---|
| 1,990,584 | Dolbey | Feb. 12, 1935 |
| 2,073,779 | Bramsen | Mar. 16, 1937 |
| 2,599,680 | Weeks | June 10, 1952 |
| 2,729,078 | Schmidt | Jan. 3, 1956 |
| 2,813,751 | Barrett | Nov. 19, 1957 |
| 2,890,836 | Gusmer et al. | June 16, 1959 |